(12) United States Patent
Arends et al.

(10) Patent No.: US 11,632,405 B2
(45) Date of Patent: Apr. 18, 2023

(54) PROXY-CALL SESSION CONTROL FUNCTION (P-CSCF) RESTORATION

(71) Applicant: T-Mobile USA, Inc., Bellevue, WA (US)

(72) Inventors: Joel Arends, Renton, WA (US); Nassereddine Sabeur, Bellevue, WA (US); Shujaur Mufti, Snoqualmie, WA (US); Subramania Kaushik, Bellevue, WA (US); Saqib Badar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/467,146

(22) Filed: Sep. 3, 2021

(65) Prior Publication Data

US 2023/0074667 A1   Mar. 9, 2023

(51) Int. Cl.
*H04L 65/1069* (2022.01)
*H04L 65/1016* (2022.01)
*H04L 65/1045* (2022.01)
*H04L 65/1104* (2022.01)

(52) U.S. Cl.
CPC ...... *H04L 65/1069* (2013.01); *H04L 65/1016* (2013.01); *H04L 65/1045* (2022.05); *H04L 65/1104* (2022.05)

(58) Field of Classification Search
None
See application file for complete search history.

(56) References Cited

U.S. PATENT DOCUMENTS

| | | | |
|---|---|---|---|
| 11,218,519 B2* | 1/2022 | Foti | H04L 67/1025 |
| 2015/0195864 A1* | 7/2015 | Bartolome | H04W 88/182 370/221 |
| 2020/0153874 A1* | 5/2020 | Christopher | H04L 65/1104 |
| 2021/0266349 A1* | 8/2021 | Foti | H04W 68/005 |
| 2021/0377896 A1* | 12/2021 | Wei | H04W 60/00 |
| 2022/0247798 A1* | 8/2022 | Guo | H04L 65/1069 |

* cited by examiner

*Primary Examiner* — Younes Naji
(74) *Attorney, Agent, or Firm* — Barta, Jones & Foley, PLLC

(57) ABSTRACT

Solutions for providing a data traffic session with proxy-call session control function (P-CSCF) restoration include: receiving an indication, by an application server (AS), that a user equipment (UE) is registered with a first proxy node (e.g., a P-CSCF); subscribing, by the AS, with a status repository, to a status of the first proxy node; receiving, by the AS, from the status repository, an indication that the first proxy node is unavailable; based on at least receiving the indication that the first proxy node is unavailable, transmitting, by the AS, to a subscriber information node, a first message triggering proxy node restoration; receiving an indication, by the AS, that the UE is registered with a second proxy node different than the first proxy node; and based on at least receiving a session initiation message, establishing the data traffic session for the UE with the second proxy node.

20 Claims, 6 Drawing Sheets

PROXY-CALL SESSION CONTROL FUNCTION (P-CSCF) RESTORATION

BACKGROUND

A proxy-call session control function (P-CSCF) is a session initiation protocol (SIP) proxy that is the first point of contact for a user equipment (UE) in a mobile network. Different types of IMS traffic, such as fifth generation (5G) cellular, fourth generation (4G) cellular, short message service (SMS), WiFi, in-vehicle local area network (LAN), and rich communication services (RCS), are supported by P-CSCFs. For example, in order to make a voice or video call, a UE sends a SIP message (e.g., a SIP invite) to a P-CSCF, which forwards it to the IMS, in order to reach the called party.

A UE typically updates its registration with a P-CSCF on a predetermined interval, such as hourly (for example, a registration may expire after an hour). UE registration with a P-CSCF is described in cellular standards 3GPP TS 23.380 and ETSI TS 123 380. However, when a P-CSCF ceases operating properly (e.g., due to being overloaded, maintenance, or some other reason) UEs that had registered with that P-CSCF may remain unaware of the service outage until their next scheduled registration update. The delay between when a P-CSCF ceases operating properly and the UE's next scheduled registration update may negatively impact a UE's connectivity-dependent functionality, such as voice or video calls, thereby degrading user experience.

SUMMARY

The following summary is provided to illustrate examples disclosed herein, but is not meant to limit all examples to any particular configuration or sequence of operations.

Solutions for providing a data traffic session with proxy-call session control function (P-CSCF) restoration include: receiving an indication, by an application server (AS), that a user equipment (UE) is registered with a first proxy node (e.g., a P-CSCF); subscribing, by the AS, with a status repository, to a status of the first proxy node; receiving, by the AS, from the status repository, an indication that the first proxy node is unavailable; based on at least receiving the indication that the first proxy node is unavailable, transmitting, by the AS, to a subscriber information node, a first message triggering proxy node restoration; receiving an indication, by the AS, that the UE is registered with a second proxy node different than the first proxy node; and based on at least receiving a session initiation message, establishing the data traffic session for the UE with the second proxy node.

BRIEF DESCRIPTION OF THE DRAWINGS

The disclosed examples are described below with reference to the accompanying drawing figures listed below, wherein.

Figure 1:
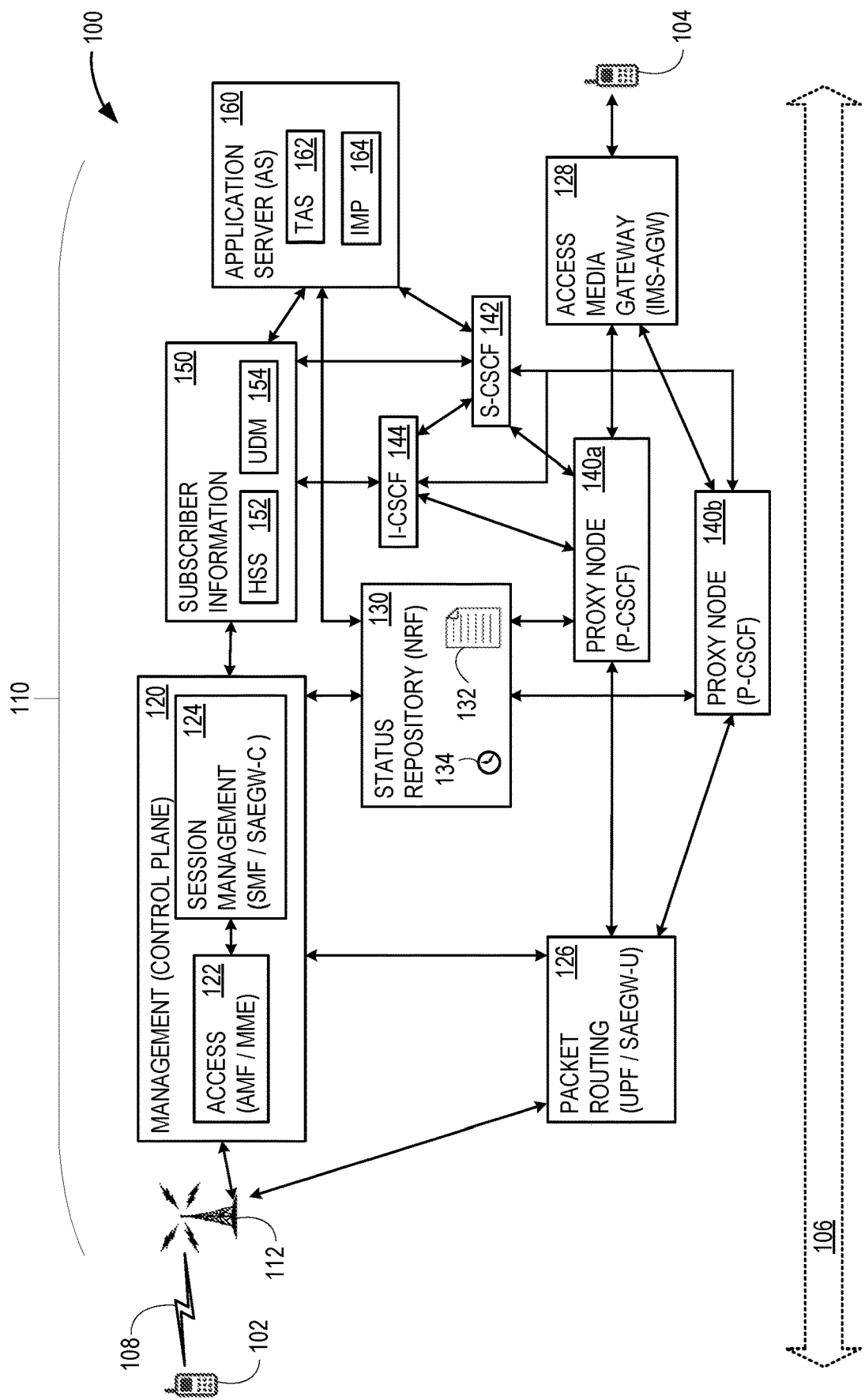
FIG. 1 illustrates an exemplary arrangement that advantageously performs proxy-call session control function (P-CSCF) restoration when providing a data traffic session.

Corresponding reference characters indicate corresponding parts throughout the drawings. References made throughout this disclosure relating to specific examples, are provided for illustrative purposes, and are not meant to limit all implementations or to be interpreted as excluding the existence of additional implementations that also incorporate the recited features.

DETAILED DESCRIPTION

Solutions for providing a data traffic session with proxy-call session control function (P-CSCF) restoration include: receiving an indication, by an application server (AS), that a user equipment (UE) is registered with a first proxy node (e.g., a P-CSCF); subscribing, by the AS, with a status repository, to a status of the first proxy node; receiving, by the AS, from the status repository, an indication that the first proxy node is unavailable; based on at least receiving the indication that the first proxy node is unavailable, transmitting, by the AS, to a subscriber information node, a first message triggering proxy node restoration; receiving an indication, by the AS, that the UE is registered with a second proxy node different than the first proxy node; and based on at least receiving a session initiation message, establishing the data traffic session for the UE with the second proxy node.

Aspects of the disclosure improve the robustness, resilience, and reliability of wireless communications by an AS, such as a telephony application server (TAS), subscribing to a status of a proxy node and, based on at least receiving an indication that the proxy node is unavailable, transmitting a message triggering proxy node restoration. The UE then locates and registers with a properly functioning proxy node. This results in the UE being registered with the properly functioning proxy node earlier than would occur if the UE instead waited until the lapse of its periodic proxy node registration. Delays that would occur within the network used by the UE are thus mitigated.

FIG. 1 illustrates an exemplary arrangement 100 that advantageously performs P-CSCF restoration when establishing a data traffic session 106 for a UE 102 on a network 110. Data traffic session 106 may be, for example a video call or a voice call with a second UE 104, using a TAS 162, or an instant messaging (IM) session using an instant messaging platform (IMP) 164. TAS 162 and IMP 164 are examples of a general AS 160, although additional types of application servers may also be used. In some examples, UE 102 comprises an internet of things (IoT) device, such as a connected appliance, a smart home security system, an autonomous factory or farming machine, a wearable health monitor, a wireless inventory tracker, or another device, rather than merely a hand-held cellular telephone. In some examples, UE 102 sets up data traffic session 106 using session initiation protocol (SIP) signaling.

UE 102 registers with a network 110, which provides data traffic session 106. UE 102 communicates over an air interface 108 with a radio access network (RAN) 112 within network 110. Data traffic passes from RAN 112 through a packet routing node 126, a selected one of proxy nodes 140a and 140b, and an internet protocol (IP) messaging system (IMS) access gateway (IMS-AGW) 128 to reach second UE 104. Signaling for data traffic session 106 passes through a control plane portion of network 110 that includes an access node 122 and a session management node 124, which together are identified as a management node 120.

In some examples, proxy node 140*a* and proxy node 140*b* each comprises a P-CSCF. In fourth generation cellular (4G) examples, access node 122 may comprise a mobility management entity (MME), whereas in fifth generation cellular (5G) examples, access node 122 may comprise an access and mobility function (AMF). In 4G examples, session management node 124 may comprise a system architecture (SAE) evolution gateway-control plane (SAEGW-C). An SAEGW-C is the combination of a serving gateway (SGW)-control plane (SGW-C) and a packet data network gateway (PGW)-control plane (PGW-C). In 5G examples, session management node 124 may comprise a session management function (SMF). In 4G examples, packet routing node 126 may comprise an SAE evolution gateway-user plane (SAEGW-U). An SAEGW-U is the combination of an SGW-user plane (SGW-U) and a PGW-user plane (PGW-U). In 5G examples, packet routing node 126 may comprise a user plane function (UPF).

A status repository 130 may comprise a network repository function (NRF), which maintains a list 132 of registered network functions (e.g., proxy nodes 140*a* and 140*b*), their status (e.g., registered, suspended), and their subscriber information (e.g., identifying any of AS 160, TAS 162 and/or IMP 164). Status repository 130 also has a heartbeat timer 134. If status repository 130 does not receive a heartbeat message from a registered network function, such as proxy node 140*a*, by the lapse of timer 134, the status of that network function will change on list 132 to indicate that the non-responsive network function is unavailable (e.g., the status changes from registered to suspended). Status repository 130 is also in communication with management node 120.

A subscriber information node 150 includes a home subscriber server (HSS) 152 and, for 5G, a unified data management function (UDM) 154. Subscriber information node 150 is in communication with management node 120, and AS 160, which represents TAS 162 and/or IMP 164. Subscriber information node 150 is also in communication with Proxy nodes 140*a* and 140*b* via an interrogating-CSCF (I-CSCF) 144 and a serving-CSCF (S-CSCF) 142. S-CSCF 142 is also in communication with AS 160. It should be understood that examples of network 110 may use different numbers of elements than shown. For example, a common core network may have six to ten pools of approximately a dozen or more P-CSCFs each.

Figure 2A:
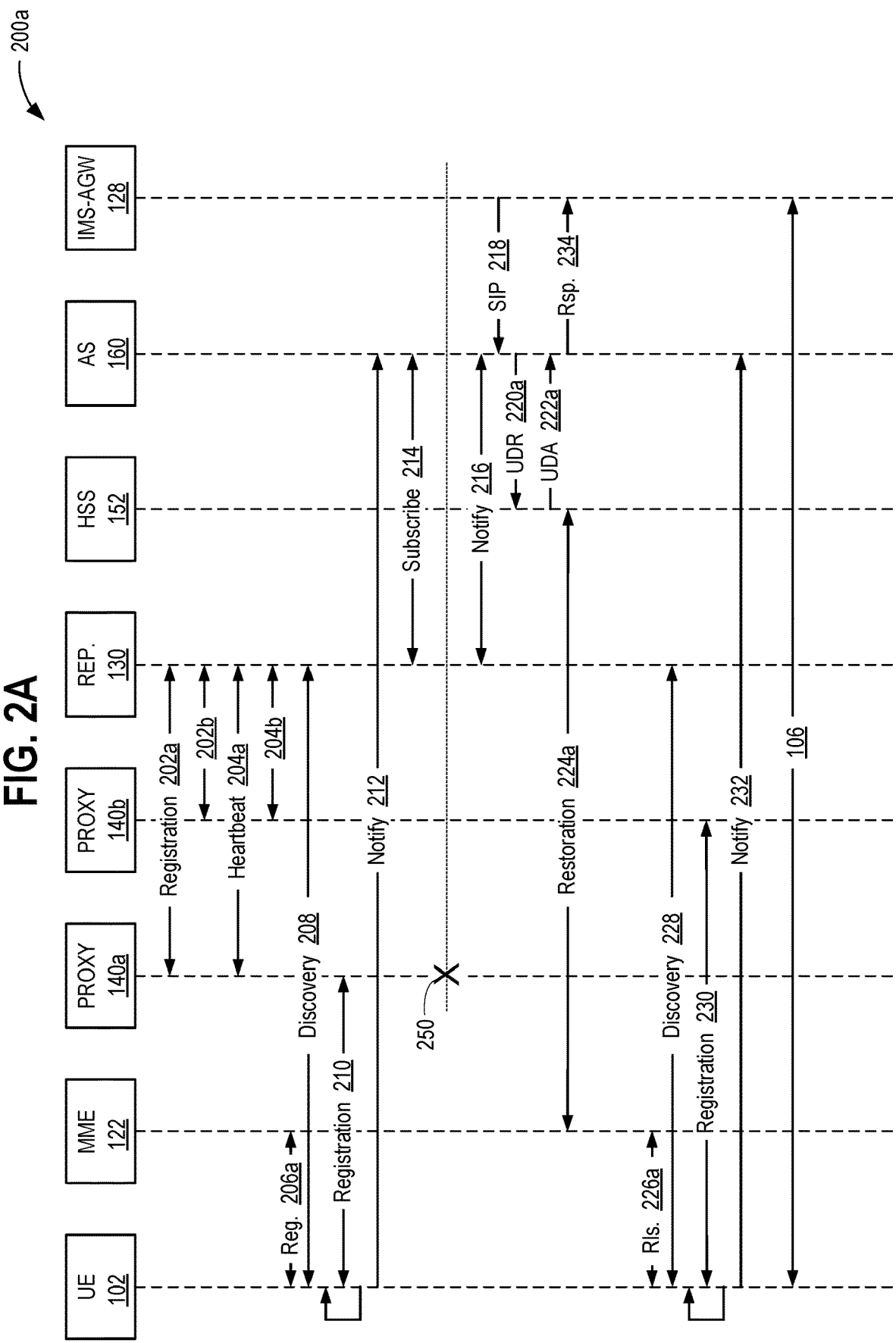
FIGS. 2A and 2B illustrate exemplary message sequence diagrams associated with examples of the arrangement of FIG. 1.

The operation of arrangement 100 is described in relation to FIGS. 2A-4. FIG. 2A illustrates an exemplary message sequence diagram 200*a* associated with P-CSCF restoration by a 4G example version of arrangement 100, and FIG. 2B illustrates an exemplary message sequence diagram 200*b* associated with P-CSCF restoration by a 5G example version of arrangement 100. Each message indicated in message sequence diagrams 200*a* and 200*b* may represent a single one-way message, a message and a response, or a plurality of messages. Referring first to FIG. 2A, proxy node 140*a* comes on-line and registers with status repository 130 using message 202*a*, and status repository 130 monitors the status of proxy node 140*a* using ongoing heartbeat messages 204*a*. When proxy node 140*b* comes on-line, it similarly registers with status repository 130 using message 202*b*, and is monitored by status repository 130 using ongoing heartbeat messages 204*b*.

UE 102 registers with network 110 using message 206*a*, shown going to access node 122 (which is an MME in 4G). UE 102 performs a proxy node discovery with status repository 130 using message 208. Upon discovering that proxy node 140*a* is in a registered status, UE 102 registers with proxy node 140*a* using message 210. UE 102 continues re-registering with proxy node 140*a*, for example hourly, according to when each registration event is scheduled to expire. AS 160 (representing TAS 162 and/or IMP 164) is notified that proxy node 140*a* is acting as a proxy for UE 102 using message 212. AS 160 subscribes to the status of proxy node 140*a* with status repository 130 using message 214 (if AS 160 had not already been subscribed). In some examples, rather than AS 160 subscribing to the status of specific proxy nodes, AS 160 subscribes to the status of all proxy nodes being monitored by status repository 130.

At failure event 250, proxy node 140*a* becomes non-responsive and ceases to send heartbeat messages 202*a* to status repository 130. Timer 134 lapses without status repository 130 receiving a heartbeat message 202*a* from proxy node 140*a*. In some examples, status repository 130 changes the status of proxy node 140*a* on list 132 to suspended. Because AS 160 is subscribed to the status of (at least) proxy node 140*a*, status repository 130 notifies (alerts) AS 160 of the change in status of proxy node 140*a* using message 216.

AS 160 receives a session initiation message 218 (e.g., a SIP invite) from IMS-AGW 128 (or another network node), for example an incoming call notification. AS 160 transmits message 220*a* to HSS 152 (representing subscriber information node 150) triggering proxy node restoration. In some examples, message 220*a* comprises a user data request (UDR) with a P-CSCF restoration indication. HSS 152 responds with a user data answer (UDA) message 222*a*. AS 160 responds to session initiation message 218 with a response message 234, although in some examples, message 234 may be delayed until UE 102 is registered with another proxy node and network 110 is able to set up data traffic session 106.

HSS 152 transmits message 224*a* to access node 122 (and receives a response) triggering proxy node restoration. Access node 122 instructs UE 102 to release the packet data network (PDN) connection through proxy node 140*a*, using a PDN connection release message 226*a*. This triggers UE 102 to release that connection and perform another proxy node discovery with status repository 130 using message 228. Upon discovering that proxy node 140*b* is in a registered status, UE 102 registers with proxy node 140*b* using message 230. UE 102 continues re-registering with proxy node 140*b*, for example hourly, according to when each registration event is scheduled to expire. AS 160 is notified that proxy node 140*b* is acting as a proxy for UE 102 using message 232. AS 160 subscribes to the status of proxy node 140*b* with status repository 130, if AS 160 had not already been subscribed. (See message 214 above). Network 110 is able to establish data traffic session 106 for UE 102 with proxy node 140*b*).

Figure 2B:
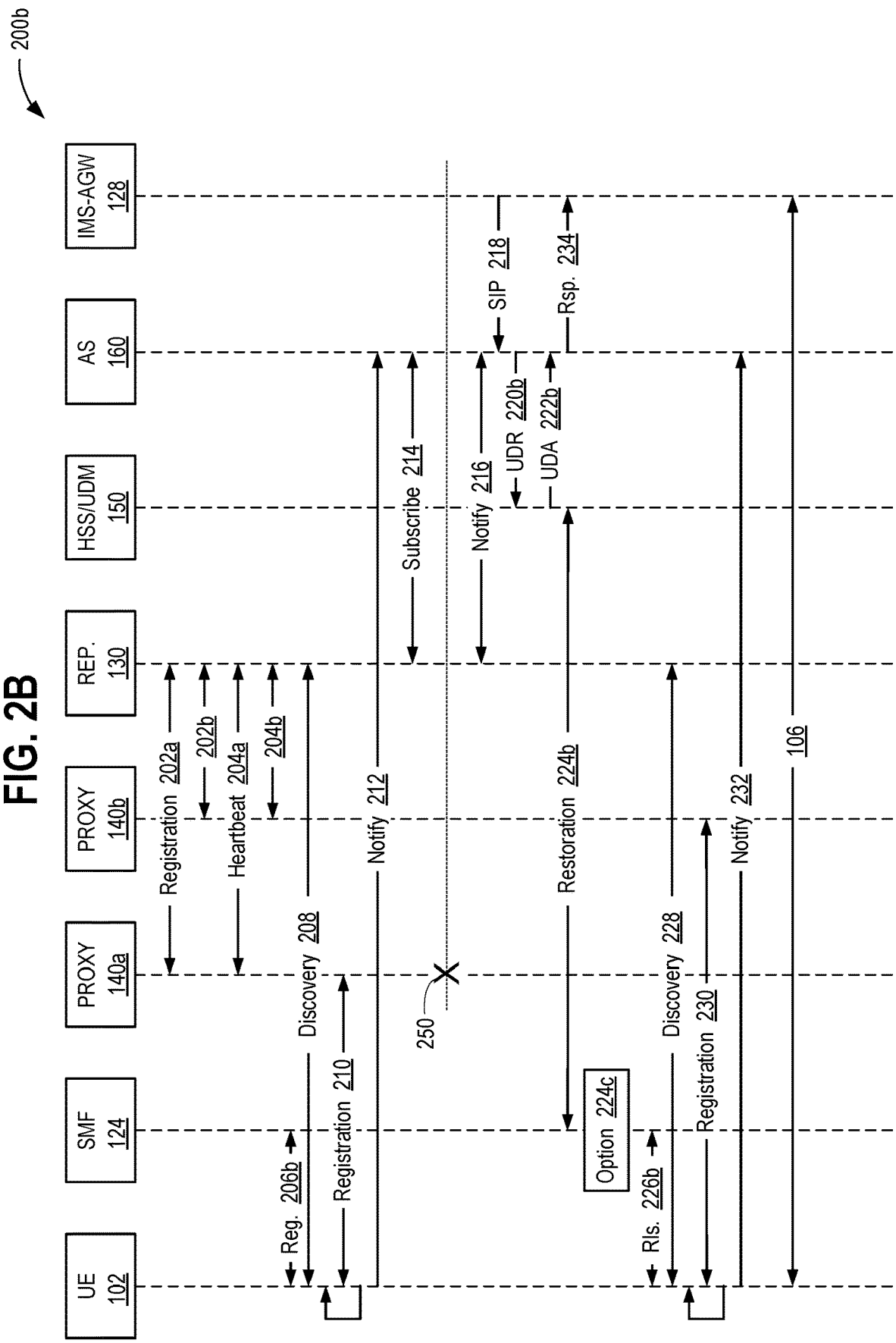

Referring now to FIG. 2B, message sequence diagram 200*b* is described based on differences from message sequence 200*a* that are due to the 5G implementation of arrangement 100 supplanting 4G functionality. Management node 120 is represented by session management node 124 (which is an SMF in 5G), rather than access node 122, and subscriber information node 150 is indicated as including a UDM, rather than just HSS 152. Registration message 206*b* between UE 102 and session management node 124 replaces message 206*a* between UE 102 and access node 122 (in message sequence diagram 200*a*). This is difference in representation, rather than function; registration of UE 102 with network 110 includes both access node 122 and session management node 124 in both 4G and 5G.

Message 220b and message 222b replace messages 220a and 222b due to the identified endpoint of subscriber information node 150, rather than only HSS 152. Similarly, message 224b replaces message 224a due to the identified endpoint difference. However, the functionality of these messages remains similar. When session management node 124 receives message 224b triggering proxy node restoration, multiple options 224c are available in 5G. These are described below in relation to box 330 and operation 332 of FIG. 3. Message 226b replaces message 226a due to the identified endpoint difference of session management node 124, rather than access node 122. Other messages indicated in message sequence diagram 200b are similar to corresponding messages indicated in message sequence diagram 200a, apart from differences that may be due to 5G versus 4G message protocols.

Figure 3:
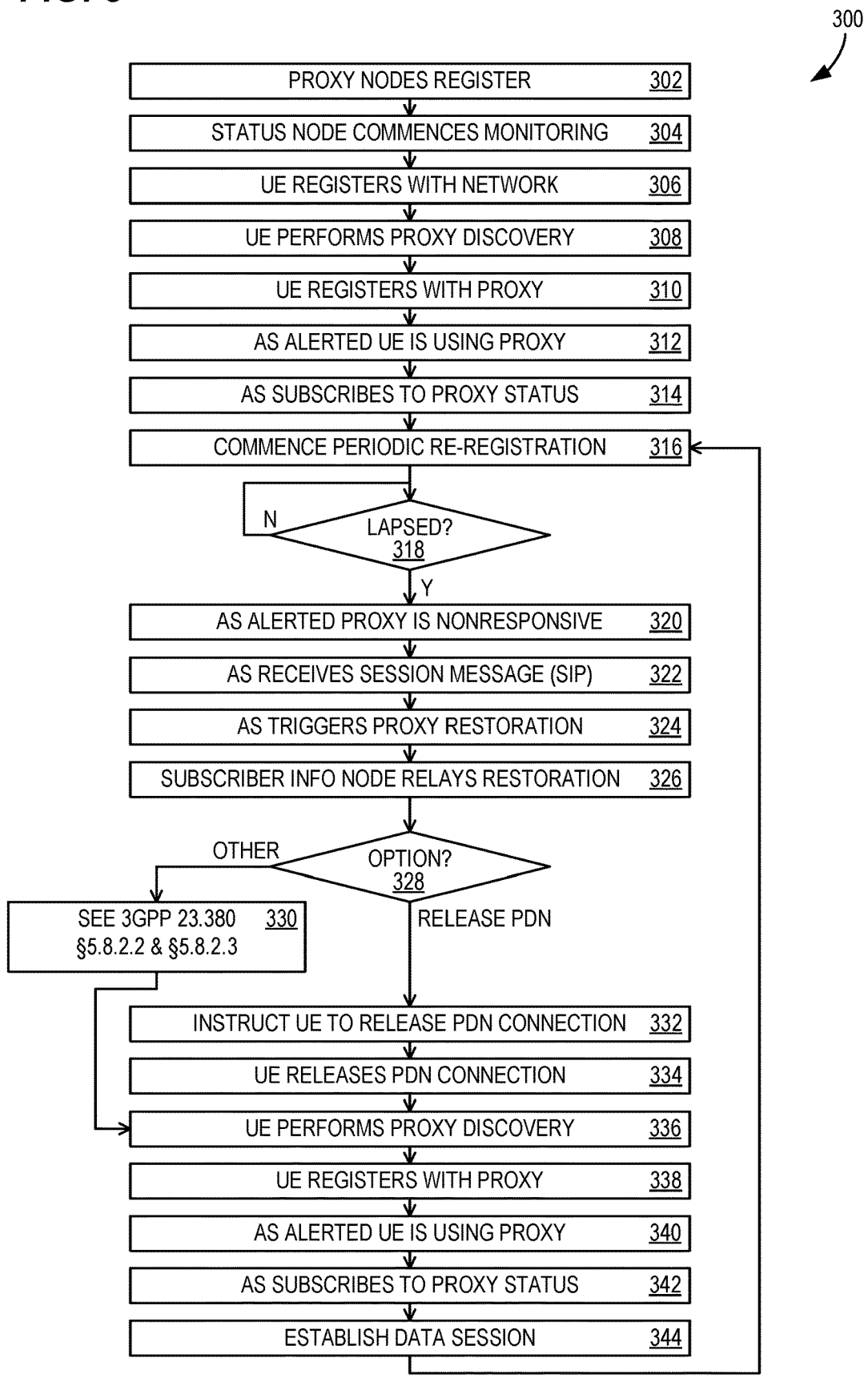
FIG. 3 illustrates a flowchart of exemplary operations associated with examples of the arrangement of FIG. 1.

FIG. 3 illustrates a flowchart 300 of exemplary operations associated with message sequence diagrams 200a and 200b, using examples of arrangement 100 to provide for P-CSCF restoration. In some examples, at least a portion of flowchart 400 may each be performed using one or more computing devices 500 of FIG. 5. Proxy nodes 140a and 140b register with status repository 130 in operation 302. That is, operation 302 includes registering, by proxy node 140a, with status repository 130, and registering, by proxy node 140b, with status repository 130. In some examples, proxy node 140a comprises a P-CSCF and proxy node 140b, comprises a P-CSCF. In some examples, status repository 130 comprises an NRF.

Status repository 130 monitors heartbeat messages in operation 304, which includes monitoring, by status repository 130, the heartbeat message from proxy node 140a and monitoring, by status repository 130, the heartbeat message from proxy node 140b. UE 102 registers with network 110 in operation 306. Operation 308 includes performing, by UE 102, a proxy node discovery with status repository 130. Operation 310 includes registering, by UE 102, with proxy node 140a. Operation 312 includes receiving an indication, by AS 160, that UE 102 is registered with proxy node 140a. In some examples, AS 160 comprises a TAS, and in some examples, AS 160 comprises an IMP or another server type.

Operation 314 includes subscribing, by AS 160, with status repository 130, to a status of proxy node 140a. UE 102 begins periodic re-registration with the serving proxy node 140a in operation 316. For example, during a first pass through flowchart 300, operation 316 includes repeatedly, based on at least a timer, re-registering, by UE 102, with proxy node 140a. When flowchart 300 later returns to operation 316, operation 316 includes repeatedly, based on at least a timer, re-registering, by UE 102, with proxy node 140b (which will be the serving proxy node at that time).

A decision operation 318 determines whether the heartbeat messages from a monitored proxy node (e.g., heartbeat messages 204a from proxy node 140a) have lapsed, and includes (at least during a first pass of flowchart 300) detecting a lapse of the heartbeat message from proxy node 140a. If the heartbeat messages remain ongoing (e.g., no lapse) flowchart 300 continues to monitor for a lapse at decision operation 318.

Otherwise, operation 320 includes, based on at least detecting the lapse of the heartbeat message from proxy node 140a, transmitting, by status repository 130, to AS 160, the indication (e.g., message 216) that proxy node 140a is unavailable. Operation 320 also includes receiving, by AS 160, from status repository 130, the indication that proxy node 140a is unavailable. In some examples, receiving the indication that proxy node 140a is unavailable comprises receiving the message indicating that proxy node 140a is suspended. Operation 322 includes receiving, by AS 160, a session initiation message (e.g., message 218). In some examples, the session initiation message comprises a SIP message (e.g., a SIP invite). In some examples, the session initiation message comprises a message session relay protocol (MSRP) message.

Operation 324 includes, based on at least receiving the indication that proxy node 140a is unavailable, transmitting, by AS 160, to subscriber information node 150, a first message (e.g., message 220a or 220b) triggering proxy node restoration. In some examples, subscriber information node 150 comprises an HSS. In some examples, subscriber information node 150 comprises a UDM. In some examples, the first message triggering proxy node restoration comprises a UDR with a P-CSCF restoration indication. In some examples, operation 324 precedes operation 322. However, in some examples, operation 322 acts as a second trigger (along with operation 320) as a trigger for operation 324. In such examples, transmitting the first message triggering proxy node restoration comprises, based on at least receiving the session initiation message and receiving the indication that proxy node 140a is unavailable, transmitting the first message triggering proxy node restoration.

Operation 326 includes 326, based on at least receiving the first message triggering proxy node restoration, transmitting, by subscriber information node 150, to management node 120, a second message (e.g., message 224a or 224b) triggering proxy node restoration. In some examples, management node 120 comprises an SMF. In some examples, management node 120 comprises an MME. In some examples, the second message triggering proxy node restoration comprises a P-CSCF restoration indication.

In 5G, management node 120 (e.g., the SMF) selects an optional restoration action in decision operation 328. The options are indicated in cellular standards 3GPP TS 23.380 and ETSI TS 123 380, for example in section 5.8.2 Common Procedures for P-CSCF Restoration in SGC. Two of the options are indicated in box 330, and are specified in section 5.8.2.2 P-CSCF Address List Update Procedure and section 5.8.2.3 DHCP based P-CSCF Selection Triggering Procedure. The third option, in section 5.8.2.4 PDU Session Release with Reactivation Procedure, is performed in operation 332. Operation 332 may also be performed by 4G versions of arrangement 100, and includes, based on at least receiving the second message triggering proxy node restoration, transmitting, by management node 120, to UE 102, an instruction to release a PDN connection. In some examples, the instruction to release the PDN connection comprises an IMS PDN connection release message. Operation 334 includes, based on at least receiving the instruction to release the PDN connection, releasing, by UE 102, a connection to proxy node 140a.

Operation 336 includes performing, by UE 102, a proxy node discovery with status repository 130, and operation 338 includes registering, by UE 102, with proxy node 140b. In operation 340, AS 160 receives an indication that UE 102 is registered with second proxy node 140b (a different proxy node than proxy node 140a). AS 160 subscribes to the status of proxy node 140b in operation 342. Operation 344 includes, based on at least receiving the session initiation message (e.g., message 218) establishing the data traffic session for UE 102 with proxy node 140b. Message 234 may be a part of operation 344. Flowchart 300 then returns to operation 316, although with UE 102 now performing on-going re-registration with proxy node 140b.

Figure 4:
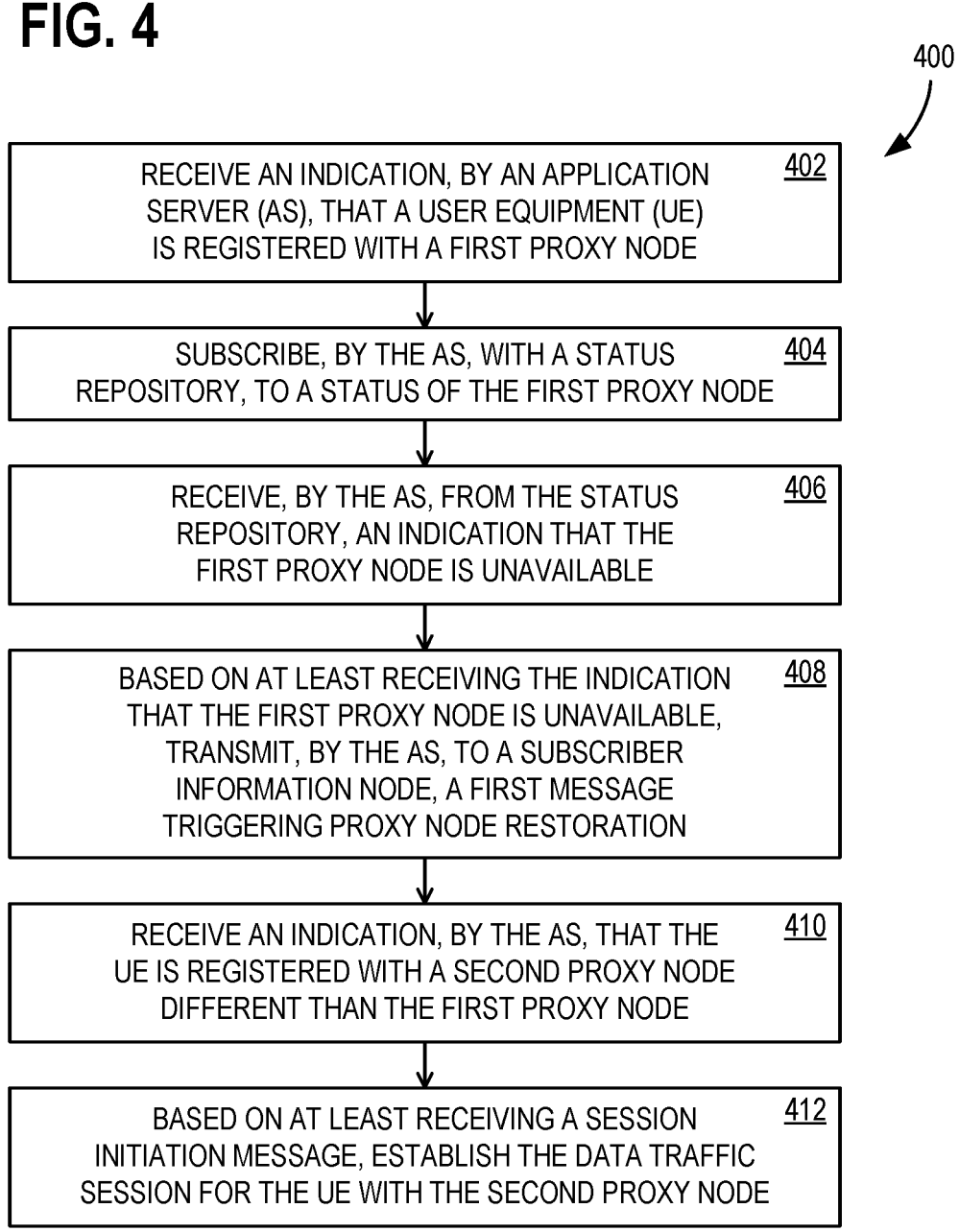
FIG. 4 illustrates a flowchart of exemplary operations associated with examples of the arrangement of FIG. 1.

FIG. 4 illustrates a flowchart 400 of exemplary operations associated with examples of arrangement 100. In some examples, at least a portion of flowchart 400 may each be performed using one or more computing devices 500 of FIG. 5. Operation 402 includes receiving an indication, by an AS, that a UE is registered with a first proxy node. Operation 404 includes subscribing, by the AS, with a status repository, to a status of the first proxy node. Operation 406 includes receiving, by the AS, from the status repository, an indication that the first proxy node is unavailable.

Operation 408 includes, based on at least receiving the indication that the first proxy node is unavailable, transmitting, by the AS, to a subscriber information node, a first message triggering proxy node restoration. Operation 410 includes receiving an indication, by the AS, that the UE is registered with a second proxy node different than the first proxy node. Operation 412 includes, based on at least receiving a session initiation message, establishing the data traffic session for the UE with the second proxy node.

Figure 5:
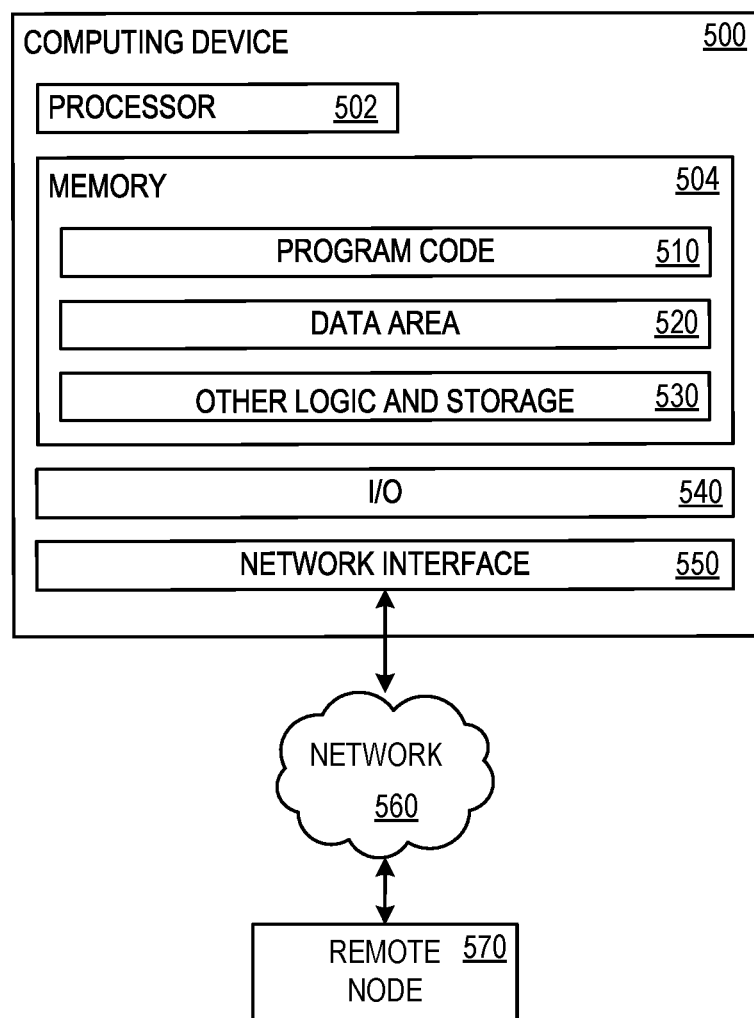
FIG. 5 illustrates a block diagram of a computing device suitable for implementing various aspects of the disclosure.

FIG. 5 illustrates a block diagram of computing device 500 that may be used as a component of arrangement 100, for example, as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500.

Additional Examples

An example method of providing a data traffic session comprises: receiving an indication, by an AS, that a UE is registered with a first proxy node; subscribing, by the AS, with a status repository, to a status of the first proxy node; receiving, by the AS, from the status repository, an indication that the first proxy node is unavailable; based on at least receiving the indication that the first proxy node is unavailable, transmitting, by the AS, to a subscriber information node, a first message triggering proxy node restoration; receiving an indication, by the AS, that the UE is registered with a second proxy node different than the first proxy node; and based on at least receiving a session initiation message, establishing the data traffic session for the UE with the second proxy node.

An example system for providing a data traffic session comprises: a processor; and a computer-readable medium storing instructions that are operative upon execution by the processor to: receive an indication, by an AS, that a UE is registered with a first proxy node; subscribe, by the AS, with a status repository, to a status of the first proxy node; receive, by the AS, from the status repository, an indication that the first proxy node is unavailable; based on at least receiving the indication that the first proxy node is unavailable, transmit, by the AS, to a subscriber information node, a first message triggering proxy node restoration; receive an indication, by the AS, that the UE is registered with a second proxy node different than the first proxy node; and based on at least receiving a session initiation message, establish the data traffic session for the UE with the second proxy node.

One or more example computer storage devices has computer-executable instructions stored thereon, which, upon execution by a computer, cause the computer to perform operations comprising: receiving an indication, by an AS, that a UE is registered with a first proxy node; subscribing, by the AS, with a status repository, to a status of the first proxy node; receiving, by the AS, from the status repository, an indication that the first proxy node is unavailable; based on at least receiving the indication that the first proxy node is unavailable, transmitting, by the AS, to a subscriber information node, a first message triggering proxy node restoration; receiving an indication, by the AS, that the UE is registered with a second proxy node different than the first proxy node; and based on at least receiving a session initiation message, establishing a data traffic session for the UE with the second proxy node.

An example system for service aware P-CSCF traffic routing comprises: a processor; and a computer-readable medium storing instructions that are operative upon execution by the processor to: receive, at a first master P-CSCF in a first pool of a plurality of P-CSCFs, IMS traffic from a first device; determine, by the first master P-CSCF, a traffic type of the IMS traffic from the first device; based on at least the traffic type of the IMS traffic from the first device, select, by the first master P-CSCF, a serving P-CSCF from the first pool for the first device; and forward, by the serving P-CSCF for the first device, the IMS traffic from the first device to an IMS.

One or more example computer storage devices has computer-executable instructions stored thereon, which, upon execution by a computer, cause the computer to perform operations comprising: receiving, at a first master P-CSCF in a first pool of a plurality of P-CSCFs, IMS traffic from a first device; determining, by the first master P-CSCF, a traffic type of the IMS traffic from the first device; based on at least the traffic type of the IMS traffic from the first device, selecting, by the first master P-CSCF, a serving P-CSCF from the first pool for the first device; and forwarding, by the serving P-CSCF for the first device, the IMS traffic from the first device to an IMS.

Alternatively, or in addition to the other examples described herein, examples include any combination of the following:

the AS comprises a TAS;
the AS comprises an IMP;
the status repository comprises an NRF;
the first proxy node comprises a P-CSCF;
the second proxy node comprises a P-CSCF;
receiving the indication that the first proxy node is unavailable comprises receiving a message indicating that the first proxy node is suspended;
the subscriber information node comprises an HSS;
the subscriber information node comprises a UDM;
the first message triggering proxy node restoration comprises a UDR with a P-CSCF restoration indication;
receiving, by the AS, the session initiation message;
session initiation message comprises a SIP message;

transmitting the first message triggering proxy node restoration comprises, based on at least receiving the session initiation message and receiving the indication that the first proxy node is unavailable, transmitting the first message triggering proxy node restoration;

based on at least receiving the first message triggering proxy node restoration, transmitting, by the subscriber information node, to a management node, a second message triggering proxy node restoration;

the management node comprises an SMF;

the management node comprises an MME;

the second message triggering proxy node restoration comprises a P-CSCF restoration indication;

based on at least receiving the second message triggering proxy node restoration, transmitting, by the management node, to the UE, an instruction to release a packet PDN connection;

based on at least receiving the instruction to release the PDN connection, releasing, by the UE, a connection to the first proxy node;

performing, by the UE, a proxy node discovery with the status repository;

registering, by the UE, with the second proxy node.

the instruction to release the PDN connection comprises an IMS PDN connection release;

the session initiation message comprises an MSRP message;

based on at least a timer, re-registering, by the UE, with the first proxy node;

based on at least a timer, re-registering, by the UE, with the second proxy node;

registering, by the first proxy node, with the status repository;

registering, by the second proxy node, with the status repository;

monitoring, by the status repository, a heartbeat message from the first proxy node;

monitoring, by the status repository, a heartbeat message from the second proxy node;

detecting a lapse of the heartbeat message from the first proxy node; and based on at least detecting the lapse of the heartbeat message from the first proxy node, transmitting, by the status repository, to the AS, the indication that the first proxy node is unavailable.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing a data traffic session, the method comprising:

receiving an indication, by an application server (AS), that a user equipment (UE) is registered with a first proxy node;

subscribing, by the AS, with a status repository, to a status of the first proxy node, wherein the status repository comprises a network repository function (NRF);

receiving, by the AS, from the status repository, an indication that the first proxy node is suspended;

based on at least receiving the indication that the first proxy node is suspended, transmitting, by the AS, to a subscriber information node, a first message triggering proxy node restoration, wherein the subscriber information node comprises a home subscriber server (HSS) and/or a unified data management function (UDM), and wherein the first message triggering the proxy node restoration comprises a user data request (UDR) with a P-CSCF restoration indication;

receiving an indication, by the AS, that the UE is registered with a second proxy node different than the first proxy node, wherein the first proxy node and the second proxy node each comprises a proxy-call session control function (P-CSCF); and based on at least receiving a session initiation message, establishing the data traffic session for the UE with the second proxy node.

2. The method of claim 1, wherein the AS comprises a telephony application server (TAS).

3. The method of claim 1, wherein the session initiation message comprises a session initiation protocol (SIP) message.

4. The method of claim 1, wherein transmitting the first message triggering proxy node restoration comprises, based on at least receiving the session initiation message and receiving the indication that the first proxy node is suspended, transmitting the first message triggering proxy node restoration.

5. The method of claim 1, further comprising:

based on at least receiving the first message triggering proxy node restoration, transmitting, by the subscriber information node, to a management node, a second message triggering proxy node restoration.

6. The method of claim 5, wherein the management node comprises a session management function (SMF) or a mobility management entity (MME), and the second message triggering proxy node restoration comprises a P-CSCF restoration indication.

7. The method of claim 5, further comprising:

based on at least receiving the second message triggering proxy node restoration, transmitting, by the management node, to the UE, an instruction to release a packet data network (PDN) connection; and based on at least receiving the instruction to release the PDN connection:

releasing, by the UE, a connection to the first proxy node;

performing, by the UE, a proxy node discovery with the status repository; and registering, by the UE, with the second proxy node.

8. A system for providing a data traffic session, the system comprising:
- a processor; and
- a computer-readable medium storing instructions that are operative upon execution by the processor to:
  - receive an indication, by an application server (AS), that a user equipment (UE) is registered with a first proxy node;
  - subscribe, by the AS, with a status repository, to a status of the first proxy node, wherein the status repository comprises a network repository function (NRF);
  - receive, by the AS, from the status repository, an indication that the first proxy node is suspended;
  - based on at least receiving the indication that the first proxy node is suspended, transmit, by the AS, to a subscriber information node, a first message triggering proxy node restoration, wherein the subscriber information node comprises a home subscriber server (HSS) and/or a unified data management function (UDM), and wherein the first message triggering the proxy node restoration comprises a user data request (UDR) with a P-CSCF restoration indication;
  - receive an indication, by the AS, that the UE is registered with a second proxy node different than the first proxy node, wherein the first proxy node and the second proxy node each comprises a proxy-call session control function (P-CSCF); and
  - based on at least receiving a session initiation message, establish the data traffic session for the UE with the second proxy node.

9. The system of claim 8, wherein the AS comprises a telephony application server (TAS).

10. The system of claim 8,
wherein
the session initiation message comprises a session initiation protocol (SIP) message.

11. The system of claim 8, wherein transmitting the first message triggering proxy node restoration comprises, based on at least receiving the session initiation message and receiving the indication that the first proxy node is suspended, transmitting the first message triggering proxy node restoration.

12. The system of claim 8, wherein the operations are further operative to:
- based on at least receiving the first message triggering proxy node restoration, transmitting, by the subscriber information node, to a management node, a second message triggering proxy node restoration.

13. The system of claim 12, wherein the management node comprises a session management function (SMF) or a mobility management entity (MME), and the second message triggering proxy node restoration comprises a P-CSCF restoration indication.

14. The system of claim 12, wherein the operations are further operative to:
- based on at least receiving the second message triggering proxy node restoration, transmitting, by the management node, to the UE, an instruction to release a packet data network (PDN) connection; and
- based on at least receiving the instruction to release the PDN connection:
  - releasing, by the UE, a connection to the first proxy node;
  - performing, by the UE, a proxy node discovery with the status repository; and
  - registering, by the UE, with the second proxy node.

15. One or more computer storage devices having computer-executable instructions stored thereon, which, upon execution by a computer, cause the computer to perform operations comprising:
- receiving an indication, by an application server (AS), that a user equipment (UE) is registered with a first proxy node;
- subscribing, by the AS, with a status repository, to a status of the first proxy node wherein the status repository comprises a network repository function (NRF);
- receiving, by the AS, from the status repository, an indication that the first proxy node is suspended;
- based on at least receiving the indication that the first proxy node is suspended, transmitting, by the AS, to a subscriber information node, a first message triggering proxy node restoration, wherein the subscriber information node comprises a home subscriber server (HSS) and/or a unified data management function (UDM), and wherein the first message triggering the proxy node restoration comprises a user data request (UDR) with a P-CSCF restoration indication;
- receiving an indication, by the AS, that the UE is registered with a second proxy node different than the first proxy node, wherein the first proxy node and the second proxy node each comprises a proxy-call session control function (P-CSCF); and
- based on at least receiving a session initiation message, establishing a data traffic session for the UE with the second proxy node.

16. The one or more computer storage devices of claim 15, wherein the AS comprises a telephony application server (TAS).

17. The one or more computer storage devices of claim 15,
wherein
the session initiation message comprises a session initiation protocol (SIP) message.

18. The one or more computer storage devices of claim 15, wherein transmitting the first message triggering proxy node restoration comprises, based on at least receiving the session initiation message and receiving the indication that the first proxy node is suspended, transmitting the first message triggering proxy node restoration.

19. The one or more computer storage devices of claim 15, wherein the operations further comprise:
- based on at least receiving the first message triggering proxy node restoration, transmitting, by the subscriber information node, to a management node, a second message triggering proxy node restoration.

20. The one or more computer storage devices of claim 19, wherein the management node comprises a session management function (SMF) or a mobility management entity (MME), and the second message triggering proxy node restoration comprises a P-CSCF restoration indication.

* * * * *